April 30, 1935.  E. C. BULLARD  1,999,393
METAL WORKING APPARATUS
Filed March 11, 1933    2 Sheets-Sheet 1

INVENTOR.
EDWARD C. BULLARD
BY
ATTORNEY

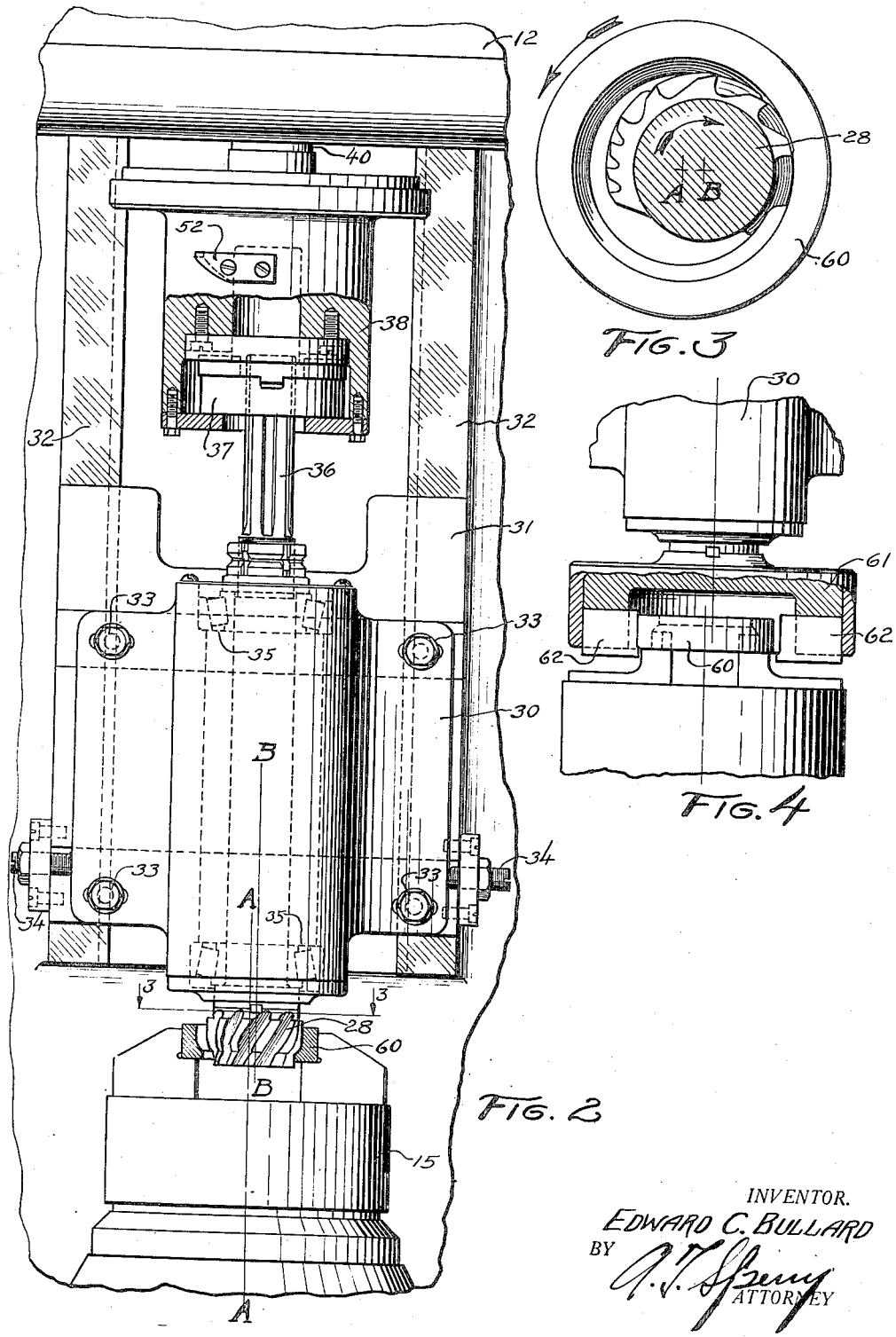

Patented Apr. 30, 1935

1,999,393

UNITED STATES PATENT OFFICE 1,999,393

METAL WORKING APPARATUS

Edward C. Bullard, Southport, Conn., assignor to The Bullard Company, a corporation of Connecticut Application March 11, 1933, Serial No. 660,421

19 Claims. (Cl. 82—2)

This invention relates to an apparatus for turning metal. The apparatus is specifically designed for carrying out the method set forth in my Patent No. 1,899,608 of which this is a division or continuation in part. While the apparatus is not limited to the method of the above patent, it is particularly designed for carrying it out and is particularly applicable to the use of the type of tool shown therein. Other tools operating on the same method or tools operating on a different method may be conveniently used.

Broadly speaking, it is an object of the present invention to provide a simple and efficient apparatus for carrying out the method set forth in the above patent and to provide an apparatus for utilizing the type of tool therein shown, it being understood that the specific structure of the tools form the subject matter of other divisional or continuing applications.

A more specific object is to provide an apparatus for rotating work at cutting speeds and for successively feeding to the work surface individual cutting blades by a single continuous movement of the cutting tool.

Another object is to provide an apparatus including means for rotating the work at cutting speed, means for moving a tool longitudinally of the work axis and thereafter moving the tool to bring about the successive engagement of cutting blades thereof with the work.

A further object is to provide an apparatus for moving a cutting tool longitudinally of the work and thereafter rotating the tool on its own axis to successively bring its blades into cutting relation with the work.

A further highly important object of the invention is to provide a simple, unitary and automatic instrumentality for synchronously carrying out the required movements for practicing the method of the patent hereinbefore mentioned.

A further object is to provide an instrumentality so arranged as to automatically and synchronously move a tool longitudinally of the work axis and after the tool has been so moved, rotated on its axis and thereafter withdraw the tool to rest position.

A further object of the invention is to provide an instrumentality of the type referred to which embodies suitable adjustments which may be easily regulated to compensate for wear so as to accommodate proper tooling of the apparatus.

Other objects of the invention are to provide an economic apparatus that will be simple to operate and in which the combination and interrelation of parts is such as to carry out the foregoing desiderata in a commercially advantageous manner.

While certain details of the apparatus may vary with specific embodiments of the method or the tools used, that form of the apparatus here shown by way of illustration includes a rotatable chuck or fixture for rotating the work on its own axis at cutting speeds, means for moving a tool longitudinally of the work so as to place it for subsequent relative movement to perform the cutting action and thirdly, means for rotating the tool on its axis after placing so as to successively bring the tool blades into cutting relation with the work.

In the drawings,

Fig. 2 is a detailed front elevation partly in section showing the tool head and its driving connection.

Fig. 3 is a section taken on line 3—3 of Fig. 2 showing the tool and work in cutting position, and Fig. 4 is a detailed view partly in section illustrating the use of a tool designed for operating on the exterior surface of the work.

Figure 1:
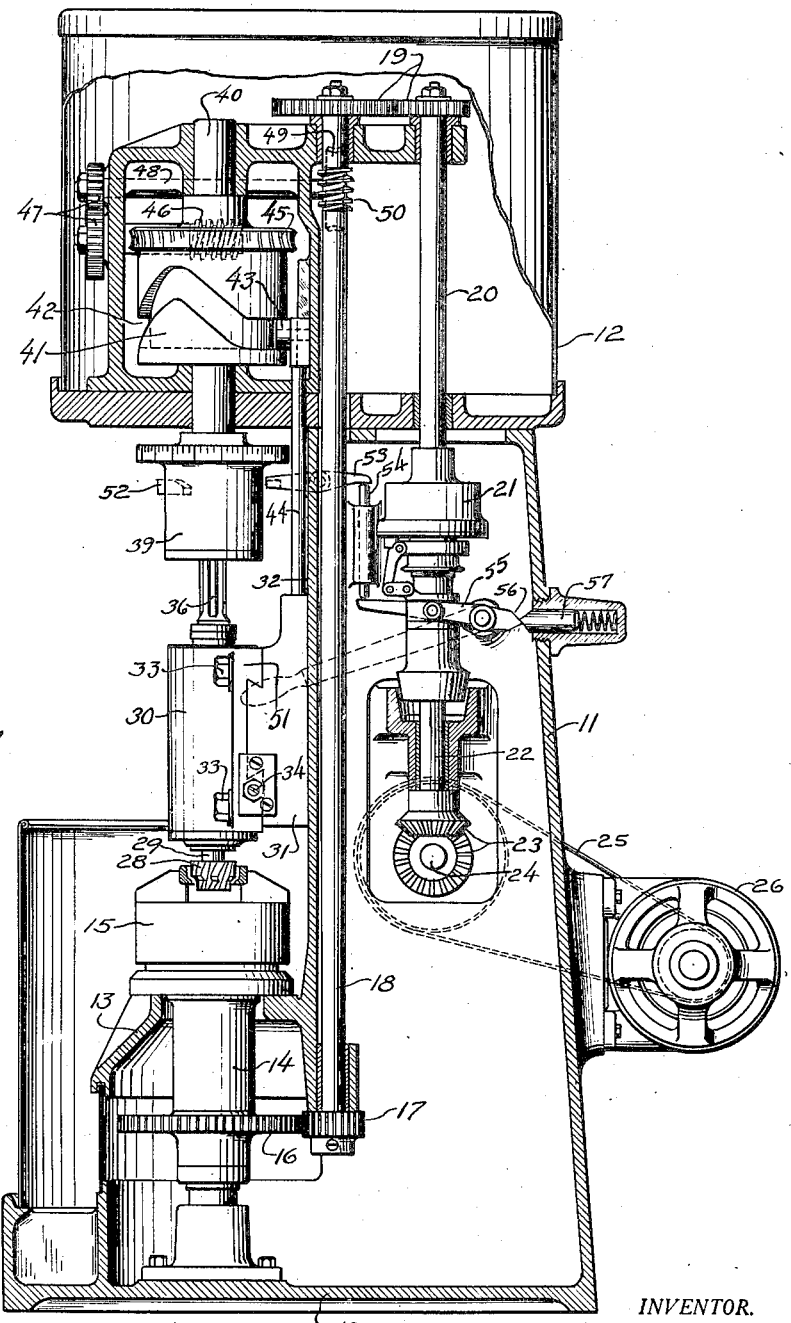
Fig. 1 is a vertical section of one embodiment of the apparatus.

For the purpose of simplicity, the driving mechanism for the apparatus here shown is depicted in rudimentary form. The driving trains are completely illustrated but certain automatic mechanisms for varying speeds and for controlling the apparatus may be incorporated and with respect thereto applicant may refer to the prior patent of E. P. Bullard, No. 1,811,876 wherein there is a detailed illustration of certain feed works mechanism and control clutches which may be suitably applied to the present machine should those skilled in the art wish to embellish it with certain automatic features not herein illustrated.

Referring to the drawings, it will be seen that the frame of the machine includes a hollow base 10 and a vertical columnar extension 11 upon which is superposed a feed works housing 12. The base portion includes an apertured extension 13 adapted to receive therethrough a spindle 14 and to support suitable spindle bearings which may be of any preferred design. The spindle 14 is provided at its upper end by a suitable work holding means such as suggested by the chuck 15. Its lower end carries a drive gear 16 meshing with a driving gear 17 on the lower end of a vertically extending main drive shaft 18, the upper end of which is driven through gears 19 from a parallel shaft 20. The lower end of shaft 20 is selectively clutched through clutch 21 to a continuously driving shaft 22 which by bevel gears 23, transverse shaft 24 and belt 25 is continuously driven from a suitable source of power such as the motor 26. The gears 19 may be change or pick-off gears so that they may be removed from the machine and substituted by gears of different ratio so that the speed of the machine with respect to the motor may be conveniently altered.

The tool 28 which may be either the type shown in Fig. 3 or Fig. 4 or of some other construction not herein illustrated, is mounted upon the lower end of a shaft 29 which is carried for vertical movement upon a sliding head 30 which is mounted for vertical movement with and transverse adjustment with respect to a slide 31 mounted upon ways 32 formed upon the front of the upstanding portion 11 of the frame. The head 30 is secured by bolts 33, for lateral adjustment of the head with respect to the slide which lateral adjustment will control the displacement of the tool axis with respect to the work axis, the bolts are loosened and adjusting screws 34 carried by the slide are varied to move the head laterally with respect to the slide and after such adjustment, the bolts may be again tightened to retain the desired alignment. Suitable bearings as indicated at 35 are provided in the head to properly mount the shaft 29 for rotation therein. The upper end of the shaft is splined as at 36 to be received within the lower portion 37 of an Oldham coupling which forms a driving coupling between a head 38 and the shaft 29. This or an equivalent coupling will maintain an established driving relation between head and shaft, but will accommodate the slight disalignment of bolts such as may be required for adjustment. Obviously, the splines on the upper end of the shaft provide for driving the shaft during vertical movement thereof in response to vertical movement of the slide.

The head 38 is mounted upon the lower end of a cam carrying shaft 40 which has mounted thereon a cam 41, the cam groove 42 of which receives therein an engaging roller 43 mounted upon the slide controlling rod 44, the cam groove and arrangement of parts being such that the slide at the end of an operating cycle is raised and as the shaft 40 is thereafter rotated the slide is quickly moved down thus inserting the tool in or surrounding the work and thereafter through the cycle the slide remains stationary. During the operating cycle continued rotation of the shaft 40 will rotate the tool to carry out the cutting method outlined in my prior patent.

Shaft 40 is driven through the cam by a cam gear 45 cooperating with worm 46 driven by pick-off or change gears 47, the companion gear of which is mounted on a shaft 48, the opposite end of which is provided with a gear 49 meshing with a worm 50 of the vertical driven shaft 18. Since both the spindle, the tool slide cam and the tool shaft itself are all driven from the vertical shaft 18, it will be seen that the actions are synchronized, the speed of the whole cycle being changeable by changing the gears 19 while the feed or tool movement cycle may be varied with respect to the spindle speed by changing the gears 47.

For controlling the operation of the machine, the main clutch 21 may be controlled by a suitable hand lever 51. To provide automatic stopping of the machine at the end of each operating cycle, a cam 52 is mounted upon the head 39 and is engageable with the rocker 53 which operates the plunger 54, the lower end of which is engageable with the clutch operating arm 55 to automatically disengage the clutch. The clutch operating arm 55 is provided with an arrow head extension 56 which cooperates with a similar spring pressed arrow head 57 whereby slight movement of the arm 55 by the cam 52 will throw the points past dead center so that further full disengaging movement of the clutch will automatically take place under the influence of the outer movement of the spring pressed head 57.

The tool used may be of the type shown in Figs. 1, 2 and 3 when it is desired to turn the inner surface of an annular work piece. This specific type of tools forms no part of the invention, they being set forth in Patent #1,899,608. The tool consists of a body carrying a series of radially stepped cutting blades which are preferably disposed at a helix with respect to the body and which upon rotation of the tool are adapted to successively engage the work piece while it is rotating at cutting speeds. Thus, each blade successively reduces the entire surface a proportionate amount. To provide for the insertion and removal of the tool with respect to the work, it is preferable to maintain the tool axis and the work axis in spaced relation. Thus, as shown in Fig. 2, the work axis is indicated by the dash line A—A while the tool axis is parallel thereto and indicated by the dash line B—B, the respective centers being indicated by the crosses A and B in Fig. 3. The tools are provided with unbladed areas which are disposed nearest the work surface during the vertical inserting and withdrawing movement of the tool thus permitting such movement without contact of the blade with the work. To compensate for adjustment and the wearing of the tool edges, the head is laterally shiftable with respect to the work axis by the screws 34. Thus, the axis of the tool may be shifted, the flexible coupling of the tool shaft permitting such action without disturbing its driving connection. In the drawings, the work is indicated by the numeral 60 and in Figure 4 an annular cutter head 61 is illustrated which carries cutting blades 62 which extend inwardly therefrom the same radial stepping being used as more clearly indicated in Fig. 3.

It will be noted that throughout the specification and claims, the word "feeding speed" has been used as distinguishing from cutting speed. This distinction is accurate in view of the fact that the rotation of the tool spindle, in the present case, acts to successively apply cutter blades to the work, each blade acting over the whole surface of the work, since the work is rotating at cutting speed and makes one or more complete revolutions before the cutter blade is rotated from all work engaging position. This is in direct distinguishment from the rotation of a milling cutter, which is rotated at cutting speed while the work moves at feeding speed, and each blade acts only on a small fraction of that surface during any one time when it is in contact with the work surface. Cutting speed is, therefore, that speed required between a tool and the work to remove material from the work, while feeding speed is the speed at which a cutter moves to cause the cutting action to move across the work surface.

In the operation of the device, the neutral position of parts consists in the clutch 21 being disengaged, the roller 43 being in the high point in the cam path, the head 39 having just moved the clutch lever 55 so as to open the clutch, but having moved slightly beyond so as to permit manual re-engagement of the clutch thereafter. With the motor running, shaft 22 will be rotated, but all other parts of the machine will be stationary so as to permit loading and unloading of the work piece, the head and slide being in the uppermost position. With the work properly positioned and chucked, the hand lever 51 is moved to engage the clutch 21. Shaft 20 will thereby be rotated from the shaft 22. The spindle will be rotated at cutting speed and the shaft 40, its cam, head 39 and the tool shaft 29 will be synchronously rotated. Upon initial rotation of the cam, the slide will be quickly moved to its lower position thus inserting the cutter 28 within the work or the cutter 61 surrounding the work. Continued rotation of the shaft 40 will leave the slide in lowermost position due to the dwell on the cam, but the cutter will be revolved on its own axis so as to successively bring its blades into engagement with the work so as to reduce the work in accordance with the method of my prior patent. The relation of the cam path to the tool blades is such that as the tool finishes its cutting action and its last blade passes from engagement with the work surface, the roller 43 will be engaged by the slope of the cam, thus to bring the tool from the work and at the height of its movement, the cam 52 will again engage the roller 53 to complete the cycle and disengage the clutch.

From the foregoing, it will be seen that the apparatus provides a simple, efficient, unitary and automatic instrumentality for properly carrying out the functions of the method disclosed in my prior patent. It will be understood that the apparatus may assume various changes and modifications and the full use of equivalents may be resorted to without departing from the spirit or scope of the invention as outlined in the appended claims.

Having thus set forth the nature of my invention, what I claim is:

1. A metal working apparatus including a rotatable work spindle, a rotatable tool spindle aligned with, but slightly eccentric to, the work spindle, means for moving one of said spindles axially in a direction parallel to the direction of the other spindle, and a means for rotating the work spindle at cutting speeds and means for rotating the tool spindles at feeding speed so as to progressively apply a cutting action over the work surface.

2. A metal working apparatus including a rotatable work spindle, a rotatable tool spindle aligned with, but slightly eccentric to, the work spindle, means for moving said tool spindle axially in a direction parallel to the direction of the work spindle, and a means for rotating said work spindle at cutting speeds and means for rotating the tool spindles at feeding speed so as to progressively apply a cutting action over the work surface.

3. A metal working apparatus including a work holding spindle, a tool holding spindle aligned with, but slightly eccentric to, the work spindle, means for moving one of said spindles longitudinally with respect to the other of said spindles and a single driving shaft for rotating one of said spindles at cutting speed and the other spindle at feeding speed so as to apply a cutting action over the work surface.

4. In a machine tool, the combination of a work spindle and a tool spindle aligned with, but slightly eccentric to, the work spindle, a cam for moving said tool spindle axially with respect to the work spindle, means operated with said cam to rotate said tool spindle at feeding speeds so as to progressively apply a cutting action over the work surface and means for rotating the work spindle at cutting speed.

5. In a machine tool, the combination with a work holder and a tool spindle aligned with, but slightly eccentric to, the work spindle and a single rotating shaft for rotating said tool spindle at feeding speed so as to progressively apply a cutting action over the work surface and moving said holder and tool spindle longitudinal with respect to each other.

6. In a machine tool, the combination with a work holder and a tool spindle aligned with, but slightly eccentric to, the work spindle of a single rotating shaft for moving said tool spindle longitudinally of the work spindle and for giving said tool spindle one revolution of rotation during each cycle of longitudinal movement.

7. A metal working apparatus including a rotatable work spindle, a rotatable tool spindle aligned with, but slightly eccentric to, the work spindle, means for moving one of said spindles axially in a direction parallel to the direction of the axis of the other spindle, means for rotating the work spindle at cutting speeds, means for rotating the tool at feeding speeds to progressively apply cutting action over the work surface, and means for transversely adjusting the tool spindle with respect to the axis of the work spindle.

8. In a machine tool, the combination of a work spindle, a drive shaft therefor for rotating the work spindle at cutting speeds, a rotatable tool spindle aligned with, but slightly eccentric to, the axis of the work spindle, a slide for said tool spindle, a cam for moving said slide, a cam shaft therefor and a means for rotating said cam shaft from said spindle driving shaft and means for rotating the tool spindle with the cam shaft.

9. In a machine tool, the combination of a work spindle, a drive shaft therefor for rotating the work spindle at cutting speeds, a tool spindle, a slide for said tool spindle, a cam for moving said slide, a cam shaft for said cam, means for rotating said cam shaft from said spindle driving shaft and means for rotating the tool spindle with the cam shaft, a clutch for operating said spindle driving shaft and automatic means for disconnecting said shaft after one cycle of operation of said cam.

10. In a machine tool, a housing structure, a work spindle mounted in said structure, a driving shaft for said work spindle, ways on said structure, a tool slide mounted on said ways, a tool spindle mounted on said slide and reciprocable therewith, a main clutch for said work spindle shaft, a tool shaft driven from said work spindle shaft and operative to rotate the tool spindle, a cam on said tool shaft operable to move said slide on said ways and means for disconnecting said clutch at the end of a single revolution of said cam.

11. In a metal working machine, a rotatable spindle fixed against longitudinal movement, a rotatable and longitudinally movable spindle aligned with, but slightly eccentric to, the axis of the first-named spindle, means for rotating the first spindle at cutting speeds, means for rotating the second spindle at feeding speeds to progressively apply a cutting action over the work surface, and a single drive shaft for rotating both of said spindles.

12. In a metal working machine, a rotatable spindle fixed against longitudinal movement, a rotatable and longitudinally movable spindle aligned with, but slightly eccentric to, the axis of the first-named spindle, means for rotating the first spindle at cutting speeds, means for rotating the second spindle at feeding speeds to progressively apply a cutting action over the work surface, and a single drive shaft for rotating both of said spindles and for reciprocating said second mentioned spindle.

13. In a metal working machine, a rotatable spindle fixed against longitudinal movement, a rotatable and longitudinally movable spindle, means for rotating the first spindle at cutting speeds, means for rotating the second spindle at feeding speeds to progressively apply a cutting action over the work surface, a single drive shaft for rotating both of said spindles and for reciprocating said second mentioned spindle, and an automatically actuated clutch for discontinuing the drive of said shaft at the expiration of one cycle of rotation of the second mentioned spindle.

14. In a machine tool including a frame having a base and a columnar vertical portion, a work spindle mounted in said base, ways on said columnar portion, a slide mounted on said ways, a feed works and feed works housing mounted on said columnar portion, means for reciprocating said slide by said feed works, a tool spindle mounted for movement with said slide and means for rotating said tool spindle from said feed works at feeding speed to produce a progressive cutting action over the work surface.

15. In a metal working apparatus, the combination of a work spindle, a stepped bladed cutter, a tool spindle therefor, means for rotating the work spindle at cutting speeds and the tool spindle at feeding speeds, and means for reciprocating said cutter into and out from a cutting position with respect to work carried by said work holding spindle.

16. A metal turning apparatus including a work spindle, means for holding work on said spindle, means for rotating said spindle at cutting speeds, a tool spindle, a multi-bladed cutter carried by the tool spindle, and means for rotating said tool spindle with its tool to successively bring the blades of said tool into cutting relation with the surface of the work carried by the spindle.

17. A metal turning apparatus including a work spindle, means for holding work on said spindle, means for rotating said spindle at cutting speeds, a tool spindle, a multi-bladed cutter carried by the tool spindle, means for rotating said tool spindle with its tool to successively bring the blades of said tool into cutting relation with the surface of the work carried by the work spindle and means for axially moving said tool and spindle so as to position said tool adjacent the work whereby rotation thereof will bring its blades into cutting position.

18. A metal working apparatus including a spindle adapted to hold work, means for rotating the spindle at cutting speeds, a multi-bladed cutter, a spindle therefor parallel to but spaced from the axis of rotation of the work spindle, means for moving the tool axially towards and from the work and means for slowly rotating the tool to cause successive action of its blades upon the surface of work held by the work spindle.

19. A metal working apparatus including a spindle adapted to hold work, means for rotating the spindle at cutting speeds, a multi-bladed cutter, a spindle therefor parallel to but spaced from the axis of rotation of the work spindle, means for moving the tool axially towards and from the work, means for slowly rotating the tool to cause successive action of its blades upon the surface of work held by the work spindle and means for transversely adjusting the tool with respect to the axis of the work spindle.

EDWARD C. BULLARD.